Patented Mar. 1, 1938

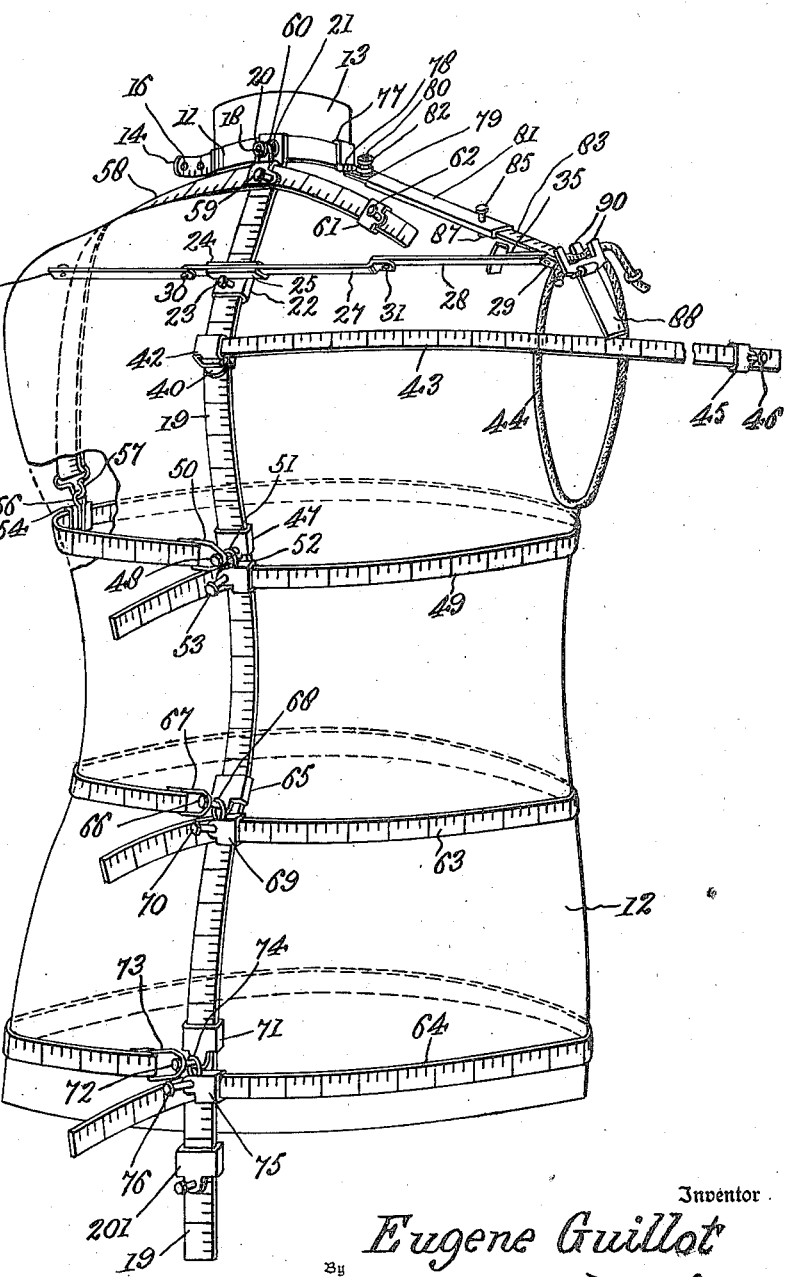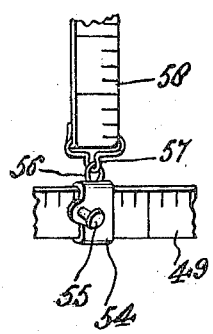

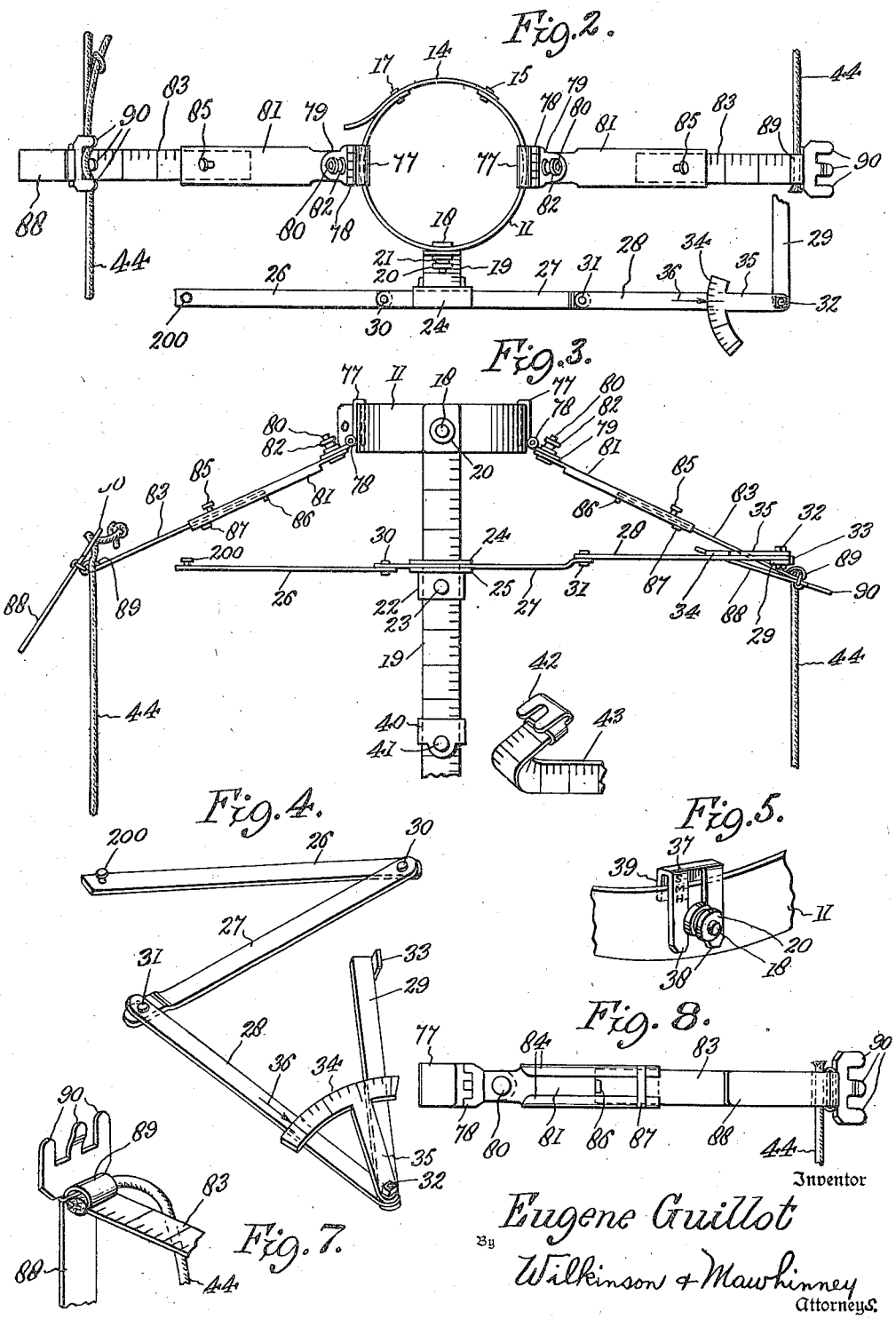

2,109,823

UNITED STATES PATENT OFFICE 2,109,823

GARMENT MEASURING DEVICE

Eugene Guillot, Helena, Mont.

Application February 26, 1937, Serial No. 128,014

10 Claims. (Cl. 33—2)

The present invention relates to improvements in garment measuring devices and has for an object to provide an improved device for taking measurements unusually accurate with respect to such garments as men's coats, vests and trousers, women's coats, jackets and the like.

The invention has for another object to provide an improved device for measuring garments in which minute measurements of every part of the customer's person may be taken in a quick and ready manner whereby to reveal items of disproportion with greatest accuracy, whereby the tailor may take into account the features of disproportion.

A further object of the invention is to provide a relatively simple device for the measurement of garments which is constructed for ready adjustment to the form of the person in such a way as to give the cutter a true pattern of such person's form, particularly as to such details as round back, large or small shoulder blades, whether one shoulder blade is proportional to the other, and involving similar measurements of the chest.

It is a further object of the invention to take account not only of the accurate measurements as to the customer's person but also as to his form and attitude; and to this end the invention further contemplates the use of flexible bars or tapes which may be pressed into the mold or form of the customer's figure, and to be retained in that condition until removed from the person's figure, laid on edge and traced on paper.

A still further object of the invention is to provide a device of the above character in which measurements both as to form and attitude may be readily transferred to a pattern, which pattern may be used as a master for producing the pattern used by the cutter.

A still further object of the invention is to translate through measurements to garments an attitude and a balance, correcting any abnormalities in the person's figure and lending to the garments when worn, an appearance of symmetry and proportion which blend in with the head attitude of the person; that is as to whether the head is erect, forward or backward.

A still further object of the invention is to produce a device of this character in which provision is made for securing the correct height of the right and the left shoulder, that is as to whether such shoulder is high, normal or sloping.

A still further object of the invention is to provide a device which will yield the width of the shoulder and the width of the back, as well as neck measurements.

A still further object of the invention is to produce a device in which the various measuring tapes, or other measuring devices, will all be carried by a single part, all being adjustable together, whereby all measures and figures may be noted and taken down at one time on the measuring blank instead of requiring the tailor to move from the figure being measured to a book wherein each figure must be successively set down in accordance with the prevailing practice.

The invention also contemplates the taking of such measurements as the rise of the waist and back of pants.

A still further object of the invention is to produce a device for measuring garments of a simple and foldable nature which admits of the same being folded into small compass for placement in a small case that may be conveniently carried about in the pocket.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a perspective view showing a form having applied thereto a measuring device constructed in accordance with the present invention.

Figure 2 is a top plan view of the improved device apart from the form.

Figure 3 is a rear elevation of the same, with parts broken away.

Figure 4 is a perspective view showing the shoulder measuring device.

Figure 5 is a similar view of the collar measuring device.

Figure 6 is a fragmentary detail showing the connection between the tapes 49 and 58.

Figure 7 is a fragmentary perspective view of the portion of the shoulder measuring device.

Figure 8 is a bottom plan view of the shoulder measuring device.

Referring more particularly to the drawings, 11 represents the collar which is preferably in the form of a spring steel band extending about the neck of the person of the customer, as indicated on the form to which the improved device is applied, which form is illustrated in Figure 1. The form is designated generally at 12 having the neck 13. The collar may be secured about the neck in any appropriate manner. It will be noted that the collar is a split collar open at its front for application to the customer's neck and in the instance shown secured in place after application by means of a strap 14 affixed as indicated at 15 to one side of the opening in the collar and having in its free end a series of holes or perforations 16 adapted to be forced over a headed stud 17 projecting from the collar at the other side of its open portion.

At the back of the collar 11 projects a threaded pin 18 over which the upper end of a vertical spinal tape measure 19 is placed, being held on the pin 18 and to the collar 11 by means of a nut 20 threaded on the pin 18 so as to be removable therefrom to permit the removal of the reinforced upper end of vertical tape 19 and its separation from the collar 11. The nut 20 has a peripheral groove 21 for convenience in receiving a hook or loop of a measuring tape as hereinafter explained.

The vertical tape 19 forms a convenient supporting member for most of the variety of measures forming parts of the present improved device. These measures have adjustable movement on the vertical tape at various heights and perform their several functions in conjunction with the vertical tape and with measurements to be taken off said vertical tape.

Movably mounted up and down on the vertical tape 19 is a slide 22. Such slide 22 is secured in adjusted position on the vertical tape 19 by a set screw 23. Such slide 22 carries jaws 24 and 25 forming a slot therebetween open rearwardly and at its sides to freely receive therein and to support a bar which forms part of a shoulder-height measure. This bar is composed of a number of sections. In the drawings four such sections are shown. The bar is illustrated more particularly in Figure 4, the sections thereof being designated as 26, 27, 28, and 29. The bar sections 26 and 27 are pivoted together as indicated at 30, the bar sections 27 and 28, as indicated at 31; and the bar sections 28 and 29, as indicated at 32. The various bar sections are disposed in different planes so that they may be folded together on their various pivotal axes. One of the end bar sections, in this instance, the bar section 29 is provided with an upstruck lug 33 of a height to engage the edges of the other three superposed bar sections whereby to prevent further folding movement of such bar sections over one another and in general to hold the bar sections in vertical alinement when in the nested or folded condition. In this collapsed condition the shoulder-height measure is contained within small compass and may be introduced into a small case with the other parts for convenience in transportation.

In use, bar section 29 is arranged so that it extends horizontally over the shoulder of the customer near juncture of the shoulder and arm, and the remaining bar sections are moved up and down by sliding the slide 22 on the vertical tape 19 until all of the sections of the bar are in substantially the same horizontal plane as the end bar member 29. The height of the shoulder may then be read from the scale on the vertical tape 19, either end of the slide 22 being employed as an index to show the measurement.

This shoulder-height measure may also be employed to show the balance and attitude of the person of the customer. For this purpose a protractor 34 is employed, the shank 35 of which is pivoted upon the pivot member 32, this pivot member consisting preferably of a nut and bolt for the purpose of tightening and loosening the protractor member to permit of such protractor member 34 and one bar section 28 moving relatively thereto in an angular manner about the common fulcrum 32. This is for the purpose of allowing the index 36 borne by the bar section 28 to move over the arcuate protractor scale.

As shown in Figures 1 and 2, the bars 26, 27 and 28 extend straight across the back in a horizontal line. The protractor 34 does not function in this instance. The bar 29 is turned at right angles to the bar 28 on the pivot 32 so that the bar 29 rests on the shoulder near the conjunction of the arm with such shoulder.

Referring to Figure 5, this device is for the purpose of giving the height of the collar wanted and consists of a clip of sheet metal bent at its intermediate part to form a web 37 having at one side the spaced fingers 38 and at the other side the flange 39. This device may be slipped over or under the collar 11. The free ends of the fingers 38 and the corners of the flange 39 are beveled off to admit of easy application to the collar 11 and to avoid sharp corners.

Below the slide 22 on the vertical tape 19 is a slidable sleeve 40 movable up and down on the vertical tape 19 and having a headed set screw 41 (Fig. 3) threaded into same and against the tape whereby to secure the sleeve 40 in the vertically adjusted position along the tape. A hook 42 on a tape measure 43 for measuring the width of the back is removably hooked over the headed set screw 41 and may extend in either direction so as to take the measurement of both halves of the back. This measure runs over to the cord 44 which encircles the arm. On the tape 43, which may be an ordinary flexible fabric tape measure, there is slidable a sleeve 45 carrying a set screw 46. The sleeve is slidable along the tape 43 in order to set it opposite the cord 44 whereupon the set screw 46 is tightened to secure the sleeve 45 at the adjusted position. The indications on the tape measure 43 may be read in conjunction with an edge of the sleeve 45. In this way a permanent record is made on the tape 43 of the customer's measurement. In the same way the sleeve 40 may be adjusted up and down on the vertical tape 19 when the set screw 41 is loosened in order to secure the proper horizontality of the tape 43.

Below the sleeve 40 is another sleeve 47 slidable up and down on the vertical tape 19 and having a set screw 48 by which it may be secured in adjusted position, the sleeve acting as an index to be read in conjunction with the scale upon the vertical tape 19 to show the height at which the chest or breast measure is made, this height being read in terms of the distance from the collar 11. This slide will indicate the depth of scye. It has the further function of acting in conjunction with the tape 49 to take the chest or breast measure. This tape 49 has at one end a loop or hook 50 adapted to be engaged over the headed set screw 48. The tape 49 is then passed in a substantially horizontal circle around one side of the back beneath the left armpit across the chest brought under the right armpit carried across the side of the back and secured at its other end portion upon the same headed set screw 48 by the use of a loop or hook 51 projecting laterally from a sleeve 52 slidable along the tape measure 49 and having the headed set screw 53 to secure such tape in the adjusted position. The sleeve 52 will indicate in conjunction with the scale on the flexible tape 49 the measurement of the chest or breast.

Slidable on the tape 49 is a sleeve 54 having a set screw 55 to secure it in adjusted position on the tape 49. Such sleeve 54 carries a lateral eye 56 engaged by an eye 57 on the flexible tape measure 58. This tape measure is brought up from beneath the left arm across the shoulder to the back where it is engaged with the collar 11 or the vertical tape 19. In this instance the flexible tape measure is shown as having slidable thereon a sleeve 59 having a lateral loop 60 for engaging over the nut 20 on the collar. It will be remembered that this nut 20 is formed with a peripheral annular groove 21, shown more particularly in Figure 2, in order to receive the loop 60 and to retain such loop in place. On the tape 58 is another slidable sleeve 61 having a set screw 62 to hold the sleeve in adjusted position on the tape. This sleeve may take the length of the inseam of the sleeve. The tape 58 takes the blade measure from the center of the back to the front of the underarm. This tape 58 also takes the strap measure. The same tape 49 may be used to take the breast, the waist and the seat measure, but for convenience in illustration and to denote these separate measures on the form, I have shown a separate tape measure 63 for taking the waist measurement and a separate tape measure 64 for taking the seat measurement. In connection with the waist measure 63 there is a sleeve 65 slidable up and down on the vertical spinal tape 19. This sleeve 65 carries a headed set screw 66 for receiving the loop 67 at one end of the waist measure tape 63 and the loop 68 upon the sleeve 69 slidable upon the other end portion of the tape 63. A set screw 70 is threaded in the sleeve 69 to hold the same in adjustable position on the tape 63.

In like manner the seat tape measure 64 is mounted in conjunction with a sleeve 71 slidable up and down on the vertical spinal tape 19 and having a set screw 72 to hold the sleeve 71 in vertically adjusted position. The set screw 72 is headed to receive the loop 73 at one end of the tape 64 and the loop 74 carried on the sleeve 75 slidable along the other end portion of the seat measure tape 64. A set screw 76 is mounted in this sleeve 75 to secure same in the adjusted position along the tape measure 64.

There is also a device for taking the shoulder measure. This device includes a hook 77 adapted to hook over the collar 11 at one or both sides thereof. This hook is connected by a hinge 78 with a swivel plate 79 on which the shoulder bar member is adapted to swivel and turn about a substantially vertical axis on the threaded pin 80 which passes through the bar section 81 and the swivel plate 79. A nut 82 is threaded on the pin 80 in order to secure the shoulder bar in adjusted position. The shoulder bar thus has a hinging movement about a horizontal axis 78 and also a swivel movement about the vertical axis 80, thus giving substantially a universal movement to the shoulder bar. The shoulder bar is composed of the section 81 and section 83. These bar sections 81 and 83 are telescoped one bar section, for instance the section 81 having inturned flanges 84 forming a guideway in which the bar section 83 is free to slide back and forth for the purpose of elongating or shortening the shoulder bar. A set screw 85 is threaded through the upper bar 81 and bears against the lower bar for the purpose of holding the bars in adjusted position. A lug 86 projects down from the bar 83 and is adapted to encounter a stop strip 87 extending across the flanges 84 of the upper bar 81 near the free end thereof. The lug 86 will encounter the strip 87 when the bar sections 81 and 83 are drawn out to their full length, thus avoiding the casual separation of the bar sections 81 and 83 and preserving the integrity of the device.

At the outer end of the bar section 83 is hinged on a substantially horizontal axis an abutment finger 88 which is adapted to lay against the arm as a guide to get the width of shoulder. On the bar 83 is a sleeve 89 for receiving therethrough one end of the cord 44. This cord may be knotted at one end to retain it in position in the sleeve 89. The cord 44 is adapted to be passed around the arm, as illustrated in Figure 1, and the free end portion is secured upon any appropriate device. For this purpose the upper end of the abutment finger 88 is formed with three or more upstanding lugs 90 in and out which the cord is intertwined. The circular cord 44 acts as a guide to get the width of the back in connection with the tape 43 as previously explained.

The spinal vertical tape measure 19 may be made of a composition of metal, for instance containing lead, that will render it flexible without substantial elasticity whereby the tape 19 may be pressed by the fingers up and down against the back so that it will be moved into the various depressions and about the projections of the back. The form 12 shown in Figure 1 is representative of the body of the customer to whom the tape 19 is applied. After the contour of the body is secured on the tape, the tape is placed on edge on a strip of any kind of paper about one inch wide and a tracing made by means of a crayon or pencil following the line of the molded tape. This strip will be sent with the order blank for the garment to be made up. On the tape 19 is a sliding sleeve 201 having a set screw by which the sleeve 201 may be affixed at any adjusted position to the tape 19, which is graduated in order to cooperate with the slide or sleeve 201 whereby to indicate garment lengths thereon.

In the use of the device, the collar 11 may be readily applied to the person of the customer and this collar rests upon the collar-bone from which all measurements are taken. This collar 11 forms the foundation of the device and substantially all parts are connected thereto or have their origin therewith. The collar 11 carries the vertical spinal tape 19. The spinal tape in turn carries the various shoulder, chest, waist and seat measuring devices. The shoulder width measuring device carries the cord 44 which cooperates with the back measuring tape 43. All of these various measuring devices may be applied simultaneously to the person of the customer and all of the measurements taken at the same time. Most of the measurements can become a matter of permanent record by securing the various set screws and retaining the various slidable sleeves in the adjusted position on the several tapes.

The various tapes and other parts may be folded and collapsed into small space. All the parts will fit into a relatively small case which can be carried about in the pocket of the tailor.

It will be noted that in taking the shoulder measurement by means of the bars illustrated in Figure 4 the protractor 34 has no function. Bars 26, 27, and 28 are extended in a straight line and inserted in the jaws of the slide 22. The bar 29 is made square at pivot point 32; that is it is turned to a right angular position with respect to the line of the other bars, whereby this bar 29 may extend in a horizontal direction across the shoulder close to the point 89 where the arm and shoulder join.

To find the height or slope of the shoulder the distance is measured from the base of the collar 11 on the tape 19 down to the upper edge of the collar 22. When the top edge of the slide 22 shows the distance of three inches down on the tape 19, then the shoulder is normal. The bar 29 must be kept in the same horizontal plane with the other bars and of course with the jaws on the slide 22 supporting the same. Consequently the slide 22 is moved up and down the tape 19. When this horizontal position is arrived at then the slope of the shoulder is indicated by the position of the top edge of the slide 22 on the tape 19.

The bars of course move up and down with the slide 22 in order to get the correct horizontal position of all of these parts. When the slide 22 is required to be lowered in order that all of the bars be in the same horizontal alinement with the bar 29 extending across the shoulder, then the shoulder has a greater slope than normal. If the slide 22 must be moved up, then the shoulder slope is higher than normal. Sometimes one shoulder is more sloping than the other. In that case the bar 29 should be applied to both shoulders independently and independent measurements taken. For this purpose the bars will have to be reversed in position to that shown in Figure 3, but the bars are readily removable from the jaws on the slide 22 to effect this purpose.

Referring again to Figure 5, this device is to get the measurement of the height of the collar of the coat. The fingers 38 fit over the screw 18 between the collar 11 and the tape 19. The top of the device is at 37. The part 39 is to enable a grip to be secured upon the device by the fingers in the act of lifting the device from engagement with the collar. Markings are shown on one of the legs 38. These measurements or indicia are read in conjunction with the top edge of the collar 11. The device may be moved up or down to three positions indicated as short, medium, or high.

Referring more particularly to Figure 6, the tapes 58 and 49 may be steel tapes. With the tape 58 I take the width across the chest from 57 to the cord 44 at the arm hole; and I take the length of the sleeve inseam to the wrist with this tape 58. Also with the tape 58 I take the strap measure from the point 57 to the point 18. This strap is at the center of the back and the proper measurement gives balance to the coat. One-half inch too long or too short will make a great difference in the hang of the coat. In taking this measure the slide 54 is moved along the horizontal tape 49 to a point where the tape line 58 comes up square against the arm hole.

The blade measure is taken from the point 48 to slide 54 with the tape 49. This tape 49 must come up well under the arm and straight across the back because the slide 47 registers on the tape 19 the depth of the scye. The scye means the bottom of the arm hole.

It is obvious that various changes and modifications may be made in the details of construction and design of the above specifically described embodiment of this invention without departing from the spirit thereof, such changes and modifications being restricted only by the scope of the following claims:—

What is claimed is:

1. In a garment measuring device, a support including a tape, a slide movably mounted on said tape with means to secure the slide in adjusted position, a bar composed of jointed members carried by said slide, one of said members having an index thereon, and a protractor movable with respect to said member and having a scale over which the index is adapted to move.

2. In a garment measuring device, a support including a vertically disposed measuring tape, a slide movable up and down on said tape, a headed member carried by said slide for securing the same in adjusted position on said tape, a second tape measure angularly intersecting said first-named tape measure, a hook carried by one end of said second tape for detachably engaging the headed member of said slide, and an affixable sleeve slidably mounted on said second tape measure.

3. In a garment measuring device, a support including a substantially vertical measuring tape, a sleeve movably mounted on the tape, a headed set screw carried by the sleeve for affixing said sleeve to the tape, a substantially horizontal body-encircling tape having a loop at one end thereof for engaging detachably over said headed set screw, a sleeve slidably mounted on the other end portion of said horizontal tape, and means for affixing the last-mentioned sleeve to said horizontal tape, said last-mentioned sleeve having a loop extending laterally therefrom for detachably engaging over said headed set screw.

4. In a garment measuring device, a collar, a spinal tape measure extending down from the rear of the collar, a slide on said vertical spinal tape measure, means for affixing said slide to said spinal tape measure, said slide having a substantially horizontal slot opening rearwardly and at its sides, and a shoulder-height measuring bar introducable edgewise through the rear open portion of the slot and having an adjustable movement horizontally in said slot across the shoulders, said bar having a pivoted section adapted to be turned at substantially right angles to the bar and extending across the outer lower portion of the shoulder, said bar and section extending in the same horizontal plane as held by the slot in said slide whereby the slide will be in substantially horizontal alinement with the bar section to measure on the spinal tape the height of the shoulder from the collar.

5. In a garment measuring device, a collar, a spinal vertical measuring tape extending down from the rear of said collar, a shoulder measuring device extending down from the side of said collar, an arm-encircling cord carried by said shoulder measuring device, a slide on said spinal tape, a horizontal tape measure extending from said slide over beyond said cord when in arm encircling position, said horizontal tape measure being entirely unconnected with the cord and having its free end extending appreciably beyond the vertical plane of the cord, and a slide freely movable along said horizontal tape measure for adjustment to the vertical plane of said cord for measuring on the horizontal tape the distance of the cord's plane from the spinal tape.

6. In a garment measuring device, a collar, a stud on the rear center portion of said collar, a vertical spinal tape measure extending down from the rear portion of said collar, a slide on said spinal tape, means to affix said slide to said tape, a horizontal tape, hook means on said horizontal tape measure for connecting the ends thereof to said slide, a second slide on said horizontal tape measure, means to affix said second silde to the horizontal tape at a point substantially beneath the arm, a third tape connected to the second slide passing up in front of the arm and across the shoulder to the rear, a third slide on said third tape having means to engage the stud on said collar, and means to affix the third slide to the third tape.

7. In a garment measuring device, a collar, a vertical spinal tape measure extending down from the rear center portion of said collar, a shoulder measuring device extending down from the side portion of said collar, a finger pivoted to the lower end portion of said shoulder measuring device and having a cradle at its upper portion, a cord affixed at one end to said shoulder measuring device adapted to encircle the arm and having its free end receivable in said cradle without coming in contact with said shoulder measuring device, and a measure extending over from the spinal tape for measuring the horizontal distance from said spinal tape of said cord.

8. In a collar measuring device, a collar, a stud projecting from the collar, and a clip composed of an upper web portion, a downwardly extending flange on the underside of the collar and downwardly extending fingers on the outside of the collar, said fingers being spaced apart to fit over said stud, means on said stud to bind against said fingers to hold the clip in the adjusted position, and indicia on said clip readable in conjunction with the upper edge of said collar.

9. In a garment measuring device, a collar, a clip connected with said collar and capable of vertical movement thereon and having spaced fingers, and means carried by said collar and received between said fingers for guiding the clip in its vertical movement.

10. In a garment measuring device, a collar, a stud projecting from the collar, and a clip composed of a downwardly extending flange on the inner side of the collar, downwardly extending spaced fingers on the outside of the collar and an upper web portion connecting the flange and spaced fingers, said stud being received by the space between the fingers to permit sliding movement of the clip in a straight line with respect to the collar.

EUGENE GUILLOT.